United States Patent
Yu

(10) Patent No.: US 11,555,695 B2
(45) Date of Patent: Jan. 17, 2023

(54) ANGLE DETECTING DEVICE AND ANGLE DETECTING METHOD

(71) Applicant: TRIPLE WIN TECHNOLOGY (SHENZHEN) CO. LTD., Shenzhen (CN)

(72) Inventor: Jun-Hui Yu, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 606 days.

(21) Appl. No.: 16/661,201

(22) Filed: Oct. 23, 2019

(65) Prior Publication Data

US 2021/0033389 A1      Feb. 4, 2021

(30) Foreign Application Priority Data

Aug. 2, 2019   (CN) .......................... 201910713764.8

(51) Int. Cl.
*G01B 11/26* (2006.01)
(52) U.S. Cl.
CPC ..................... *G01B 11/26* (2013.01)
(58) Field of Classification Search
CPC ...................................................... G01B 11/26

USPC ....................................................... 356/152.1
See application file for complete search history.

(56) References Cited

FOREIGN PATENT DOCUMENTS

| CN | 102120230 | A | | 7/2011 | |
|---|---|---|---|---|---|
| CN | 207399417 | U | | 5/2018 | |
| GB | 2461999 | A | * | 1/2010 | ........... G01B 11/026 |
| JP | H05133737 | A | * | 5/1993 | |
| WO | WO-2017007078 | A1 | * | 1/2017 | ............... C01C 3/14 |

\* cited by examiner

*Primary Examiner* — Sunghee Y Gray
(74) *Attorney, Agent, or Firm* — ScienBiziP, P.C.

(57) ABSTRACT

An angle detecting device for detecting a bending angle of an element. The element comprises a first connecting portion and a second connecting portion bent relative to the second connecting portion. The angle detecting device comprises a fixing member, a non-contact range finder and a base. The fixing member comprises a first fixing portion and a second fixing portion. The fixing member and the non-contact range finder is mounted on the base. The first fixing portion cooperates with the second fixing portion to fix the first connecting portion. The non-contact range finder faces the second connecting portion to detect a distance between the second connecting portion and the non-contact range finder, and determine whether the distance is within a preset range. An angle detecting method using the above angle detecting device is also provided.

16 Claims, 5 Drawing Sheets

ANGLE DETECTING DEVICE AND ANGLE DETECTING METHOD

FIELD

The subject matter herein generally relates to an angle detecting device and an angle detecting method.

BACKGROUND

In a packing process of electronic products, it is usually necessary to bend the flexible circuit board at an angle to facilitate installation in the electronic product. Prior to installation, it is necessary to measure and screen the bend angle of the flexible circuit board.

BRIEF DESCRIPTION OF THE DRAWINGS

Implementations of the present disclosure will now be described, by way of embodiments, with reference to the attached figures.

DETAILED DESCRIPTION

Figure 1:
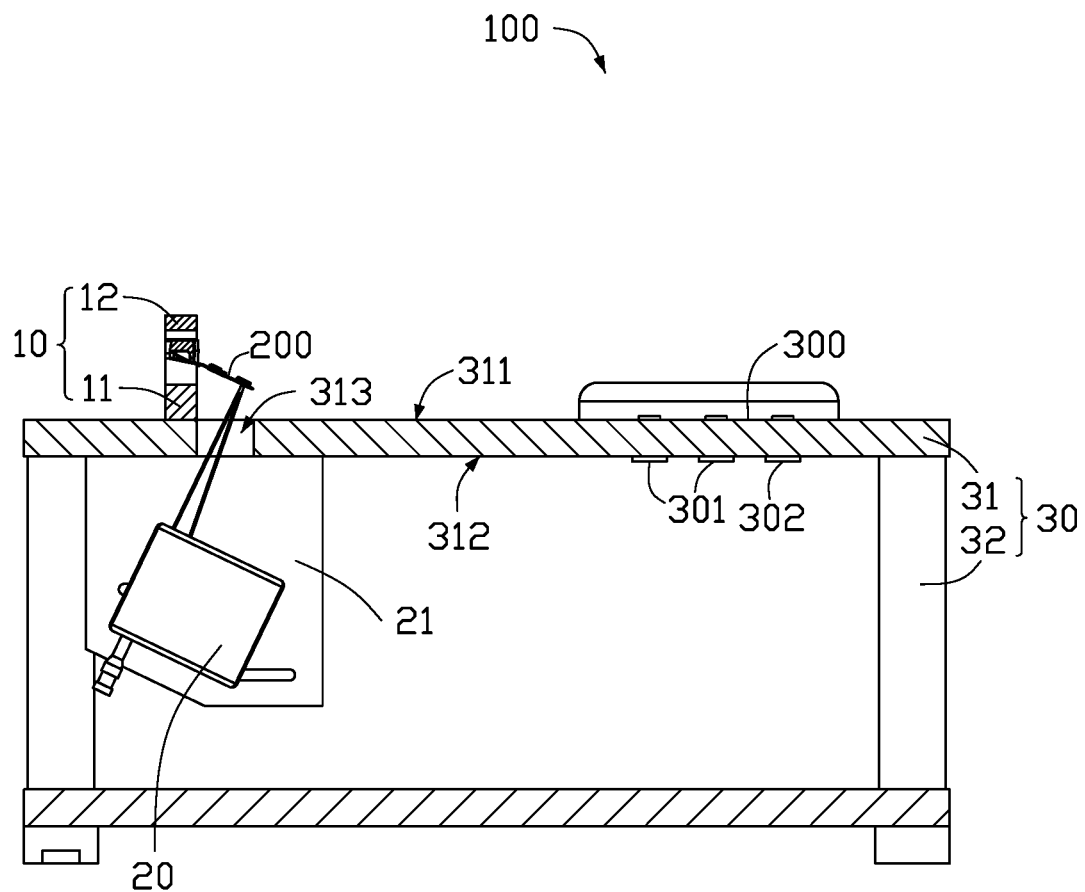
FIG. 1 is a cross-sectional view of an embodiment of an angle detecting device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, Group, series, and the like.

Figure 3:
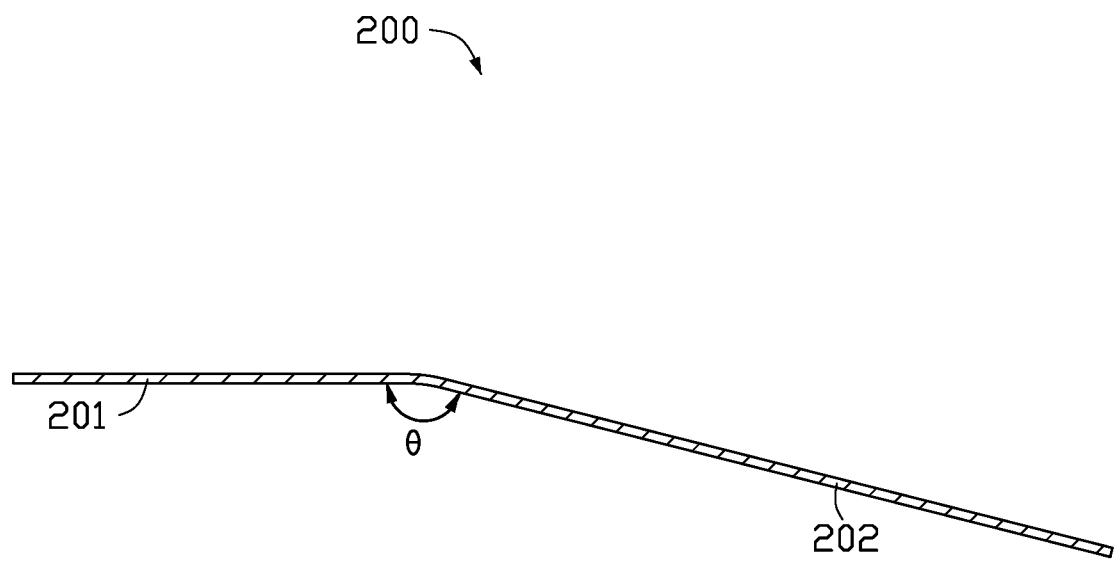
FIG. 3 is a cross-sectional view of an embodiment of an element to be detected.

FIG. 1 illustrates an embodiment of an angle detecting device 100 for detecting a bending angle θ of an element 200 (shown in FIG. 3). Referring to FIG. 3, the element 200 may be a circuit board. The circuit board includes a first connecting portion 201 and a second connecting portion 202 connected to the first connecting portion 201. The first connecting portion 201 is bent relative to the second connecting portion 202 to form the bending angle θ.

Figure 4A:
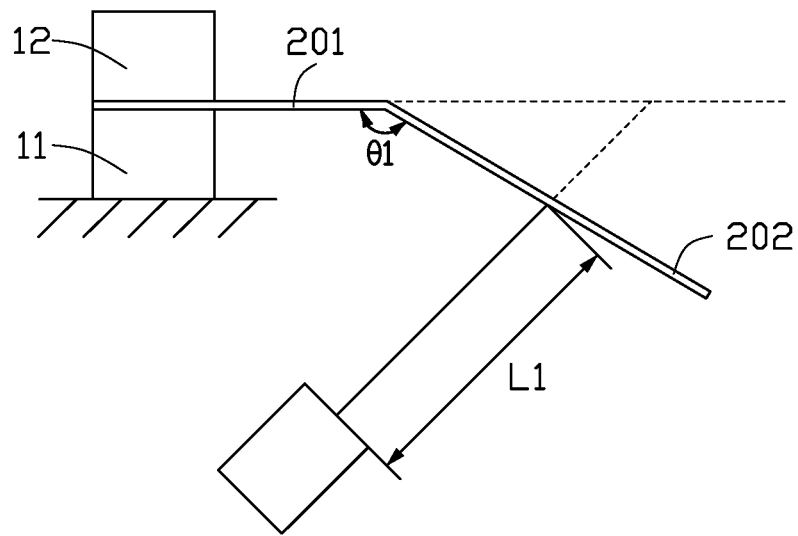
FIG. 4A is a schematic diagram of the angle detecting device of FIG. 1.
Figure 4B:
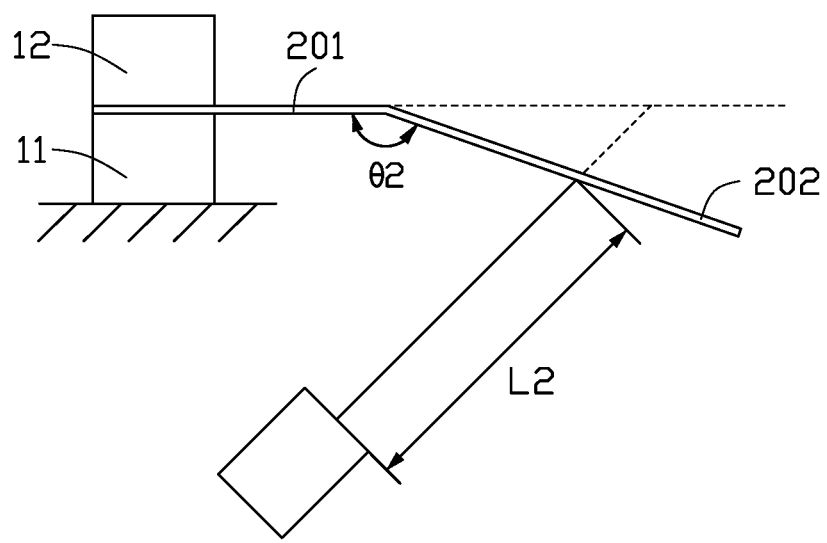
FIG. 4B is a schematic diagram of the angle detecting device of FIG. 1

In at least one embodiment, referring to FIG. 1, the angle detecting device 100 includes a fixing member 10, a non-contact range finder 20 and a base 30. The fixing member 10 and the non-contact range finder 20 are mounted on the base 30, respectively. Referring to FIGS. 4A and 4B, when the angle detecting device 100 detects the bending angle θ of the detected element 200, the first connecting portion 201 is fixed to the fixing member 10, the second connecting portion 202 protrudes from the fixing member 10 and faces the non-contact range finder 20. The non-contact range finder 20 detects a distance L between the second connecting portion 202 and the non-contact range finder 20, and determines whether the distance L is within a preset range of L1 to L2.

In at least one embodiment, a ranging principle of the non-contact range finder 20 is to emit a ranging transmission signal to a detected target, receive a ranging return signal reflected by the detected target, and calculate a distance between the detected target (ie, the second connecting portion 202) and the non-contact range finder 20 according to a transmission speed of the ranging transmission signal, a transmission speed of the ranging return signal, a emitting time when the ranging transmission signal is emitted, and a receiving time when the ranging return signal is received. A difference between the emitting time and the receiving time is a transmission time. The ranging transmission signal and the ranging return signal may be in a form of sound, light or electricity. In this illustrated embodiment, the ranging transmission signal and the ranging return signal is in the form of light to be transmitted. The non-contact range finder 20 is a laser range finder.

Referring to FIG. 1, in at least one embodiment, the base 30 includes a mounting portion 31. The fixing member 10 and the non-contact range finder 20 are mounted on the mounting portion 31.

In at least one embodiment, the non-contact range finder 20 is fixed on a fixing plate 21, and mounted on the mounting portion 31 by the fixing plate 21.

The mounting portion 31 includes a first surface 311 and a second surface 312 facing away from the first surface 31. In at least one embodiment, the second surface 312 is parallel to the first surface 311. The mounting portion 31 further includes an opening 313 penetrating the first surface 311 and the second surface 312. The fixing member 10 is mounted on the first surface 311 and adjacent to the opening 313. The second connecting portion 202 corresponds to the opening 313 and is located on a side of the first surface 311 facing away from the second surface 312. The non-contact range finder 20 is mounted on the second surface 312 by the fixing plate 21 and adjacent to the opening 313. The ranging transmission signal emitted by the non-contact range finder 20 passes through the opening 313 to transmit to the second connecting portion 202, and the ranging return signal reflected by the second connecting portion 202 passes through the opening 313 to transmit to the non-contact range finder 20.

Figure 2:
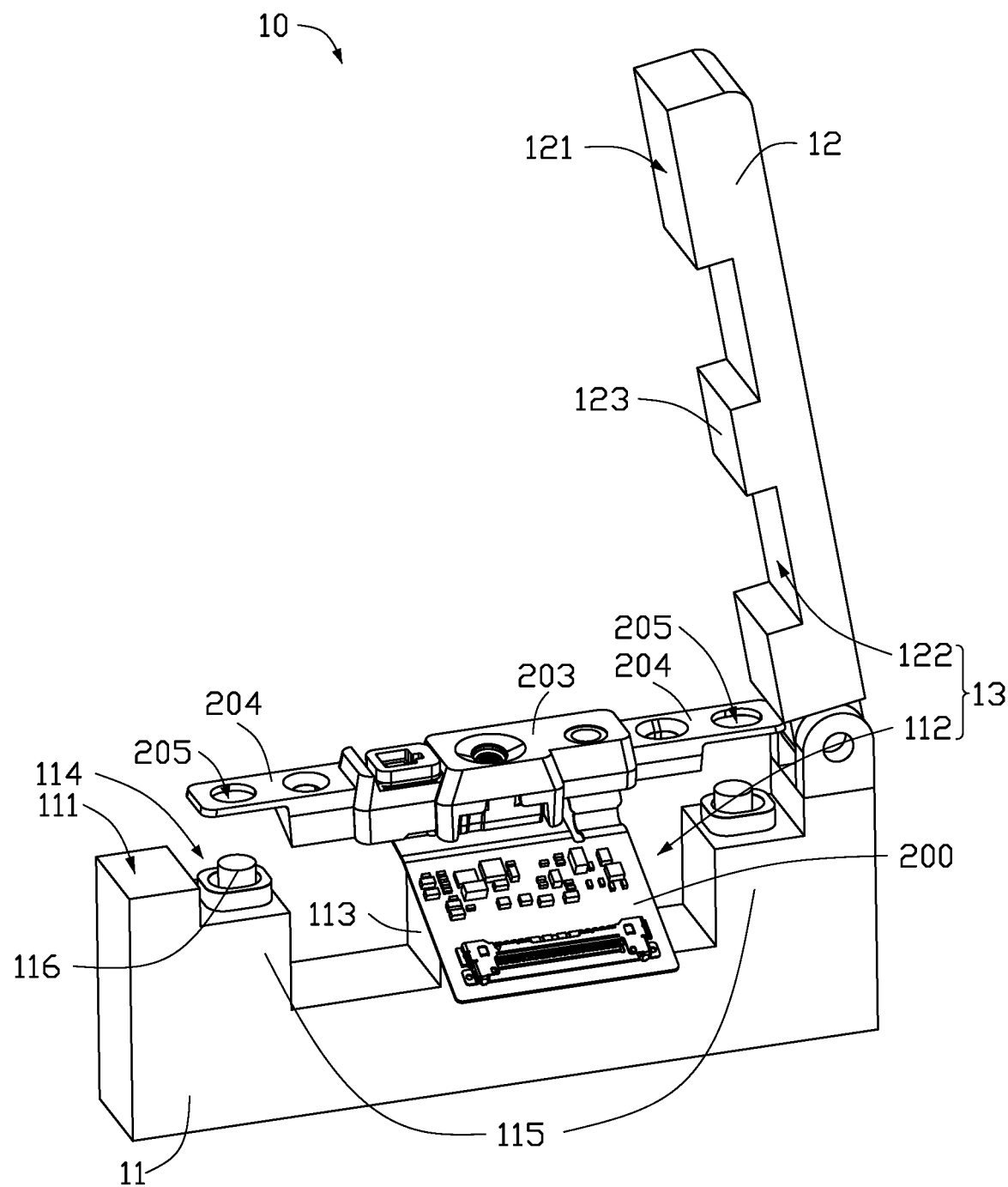
FIG. 2 is a diagram of an embodiment of a fixing member.

In at least one embodiment, referring to FIG. 2, the fixing member 10 includes a first fixing portion 11 and a second fixing portion 12. The first fixing portion 11 is fixedly coupled to the base 30. The second fixing portion 12 is movably connected to the first fixing portion 11. The first fixing portion 11 cooperates with the second fixing portion 12 to fix the first connecting portion 201.

In at least one embodiment, the first fixing portion 11 includes a third surface 111 facing the second fixing portion 12. The second fixing portion 12 includes a fourth surface 121 facing the first fixing portion 11. The third surface 111 is recessed inward to form two spaced first slots 112. The fourth surface 121 is recessed inward to form two spaced second slots 122. Each second slot 122 corresponds to one of the first slots 112. A first bump 113 is formed between the spaced first slots 112. A second bump 123 is formed between the spaced second slots 122.

In at least one embodiment, referring to FIG. 2, the angle detecting device 100 may further include a fastening member 203. Each of two opposite end portions of the fastening member 203 extends to form an extending portion 204. A positioning hole 205 is formed on each extending portion 204.

The third surface 111 is further recessed inward to form two positioning grooves 114. The two positioning grooves 114 are respectively located on opposite sides of the two first slots 112. Each positioning groove 114 is in communication with the adjacent first slot 112. Each second slot 122 cooperate with the corresponding first slot 112 and the adjacent positioning groove 114 to form a receiving space 13. In at least one embodiment, a depth of the positioning groove 114 is less than a depth of the adjacent first slot 112 to form a step portion 115 between the positioning groove 114 and the adjacent first slot 112. A positioning post 116 is formed a surface of each step portion 115 facing the positioning groove 114.

The extending portions 204 are received in the receiving space 13. The positioning post 116 cooperates with the positioning hole 205 to position the fastening member 203. The fastening member 203 is located between the first fixing portion 11 and the second fixing portion 12, and sandwiched between the first bump 113 and the second bump 123. The first connecting portion 201 is sandwiched between the fastening member 203 and the first bump 113 to fix the detected element 200 on the fixing member 10.

In at least one embodiment, referring to FIG. 1, the angle detecting device 100 may further include an indicating unit 300. The indicating unit 300 is mounted a region of the first surface 311 away from the opening 313 and electrically connected to the non-contact range finder 20. The indicating unit 300 includes a first test indicating lamp 301a and a second test indicating lamp 301b. The first test indicating lamp 301a and the second test indicating lamp 301b show different colors. In at least one embodiment, when the distance L is within the preset range of L1 to L2, the first test indicating lamp 301a lights up. When the distance L is not within the preset range of L1 to L2, the second test indicating lamp 301b lights up.

In at least one embodiment, the indicating unit 300 may further include an operation indicating lamp 302 electrically connected to the non-contact range finder 20. When the non-contact range finder 20 is in an operative state, the operation indicating lamp 302 lights up. When the non-contact range finder 20 is in an inoperative state, the operation indicating lamp 302 turns off.

In at least one embodiment, the base 30 may further include a supporting portion 32 for supporting the mounting portion 31. The non-contact range finder 20 may be mounted on the supporting portion 32.

Figure 5:
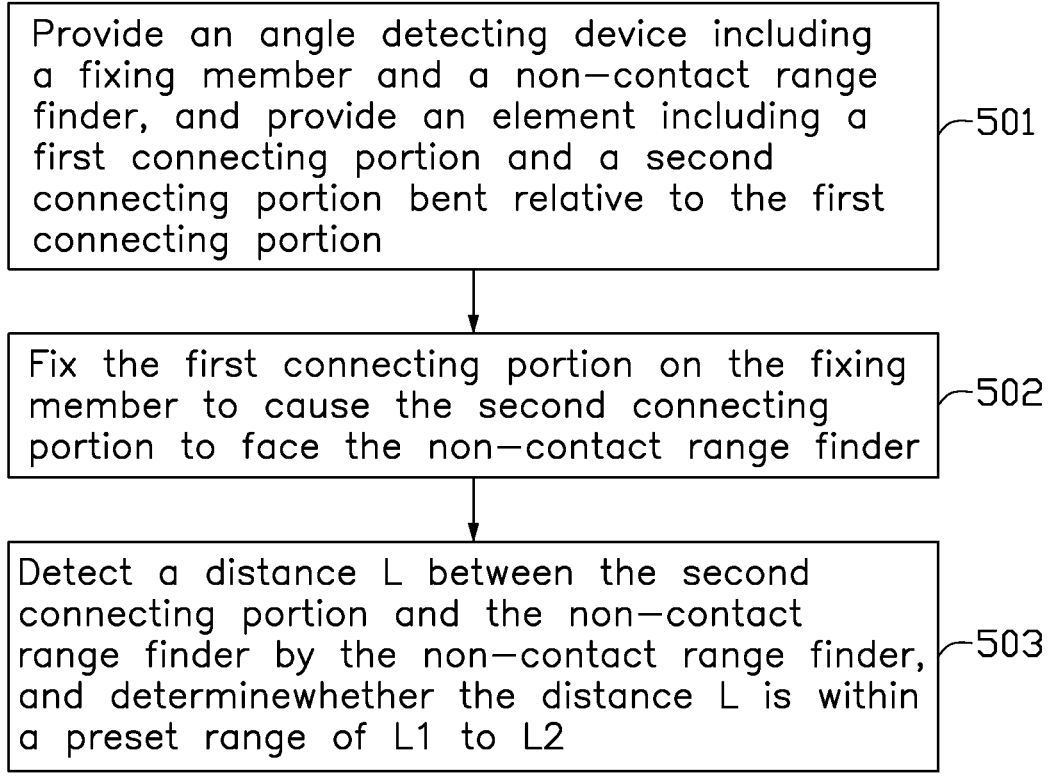
FIG. 5 is a flowchart of another embodiment of an angle detecting method.

FIG. 5 illustrates a flowchart of an angle detecting method in accordance with another embodiment. The angle detecting method applying the above angle detecting device 100 (shown in FIG. 1) is provided by way of embodiments, as there are a variety of ways to carry out the method. Each block shown in FIG. 5 represents one or more processes, methods, or subroutines carried out in the method. Furthermore, the illustrated order of blocks can be changed. Additional blocks may be added or fewer blocks may be utilized, without departing from this disclosure. The method can begin at block 501.

At block 501, an element 200 is provided to be detected. The detected element 200 includes a first connecting portion 201 and a second connecting portion 202 bent relative to the first connecting portion 201.

At block 502, the first connecting portion 201 is fixed on the fixing member 10, and the second connecting portion 202 faces the non-contact range finder 20.

At block 503, the non-contact range finder 20 detects a distance L between the second connecting portion 202 and the non-contact range finder 20, and determines whether the distance L is within a preset range of L1 to L2.

The angle detecting device 100 detects the bending angle $\theta$ between the connecting portion 201 and the second connecting portion 202 through detecting the distance L between the second connecting portion 202 and the non-contact range finder 20 by the non-contact range finder 20. The angle detecting method using the angle detecting device 100 is convenient, fast and accurate.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:
1. An angle detecting device for detecting a bending angle of an element, the element comprising a first connecting portion and a second connecting portion bent relative to the first connecting portion, the angle detecting device comprising:
at least one fixing member comprising a first fixing portion and a second fixing portion;
a non-contact range finder; and
a base;
wherein the at least one fixing member and the non-contact range finder is mounted on the base, the first fixing portion cooperates with the second fixing portion to fix the first connecting portion, the non-contact range finder faces the second connecting portion to detect a distance between the second connecting portion and the non-contact range finder, and the non-contact range finder determines whether the distance is within a preset range; the base comprises a mounting portion, the mounting portion comprises a first surface and a second surface facing away from the first surface, an opening penetrates the first surface and the second surface, the fixing member is mounted on the first surface and adjacent to the opening, the second connecting portion corresponds to the opening and is located on a side of the first surface facing away from the second surface, the non-contact range finder is mounted on the second surface and adjacent to the opening, the non-contact range finder emits a ranging transmission signal to pass through the opening to the second connecting portion, receives a ranging return signal reflected by the second connecting portion and passing through the opening, and calculates the distance according to the ranging transmission signal and the ranging return signal.

2. The angle detecting device of claim 1, wherein the angle detecting device comprises a fixing plate, the non-contact range finder is mounted on the mounting portion by the fixing plate.

3. The angle detecting device of claim 1, wherein the second fixing portion is movably connected to the first fixing portion, the first connecting portion is sandwiched between the first fixing portion and the second fixing portion.

4. The angle detecting device of claim 3, wherein the first fixing portion comprises a third surface facing the second fixing portion, the second fixing portion comprises a fourth surface facing the third surface, the third surface is recessed inward to form two spaced first slots, the fourth surface is recessed inward to form two spaced second slots, a first bump is formed between the spaced first slots, a second bump is formed between the spaced second slots, each first slot corresponds to one of the second slots, the first bump corresponds to the second bump, the first bump and the second bump are used to clamp the first connecting portion.

5. The angle detecting device of claim 4, wherein the angle detecting device further comprises a fastening member sandwiched between the first bump and the second bump, the fastening member cooperates with the first bump to clamp the first connecting portion.

6. The angle detecting device of claim 5, wherein each of two opposite end portions of the fastening member extends to form an extending portion, a positioning hole is formed on each extending portion; the first fixing portion further comprises two positioning posts corresponding to the positioning holes, the positioning posts cooperate with the positioning holes to position the fastening member.

7. The angle detecting device of claim 1, wherein the angle detecting device further comprises a first test indicating lamp and a second test indicating lamp, the first test indicating lamp and the second test indicating lamp are electrically connected to the non-contact range finder, when the distance is within the preset range, the first test indicating lamp lights up; when the distance is not within the preset range, the second test indicating lamp lights up.

8. The angle detecting device of claim 1, wherein the angle detecting device further comprises an operation indicating lamp electrically connected to the non-contact range finder, when the non-contact range finder is in an operative state, the operation indicating lamp lights up; when the non-contact range finder is in an inoperative state, the operation indicating lamp turns off.

9. An angle detecting method comprising:
providing an angle detecting device comprising:
at least one fixing member comprising a first fixing portion and a second fixing portion;
a non-contact range finder; and
a base;
wherein the at least one fixing member and the non-contact range finder is mounted on the base; the base comprises a mounting portion, the mounting portion comprises a first surface and a second surface facing away from the first surface, an opening penetrates the first surface and the second surface, the fixing member is mounted on the first surface and adjacent to the opening, the second connecting portion corresponds to the opening and is located on a side of the first surface facing away from the second surface, the non-contact range finder is mounted on the second surface and adjacent to the opening;
providing an element comprising a first connecting portion and a second connecting portion bent relative to the first connecting portion;
fixing the first connecting portion on the fixing member, wherein the first connecting portion is clamped by the first fixing portion and the second fixing portion cooperating with each other, the second connecting portion faces the non-contact range finder;
detecting a distance between the second connecting portion and the non-contact range finder by the non-contact range finder, wherein the non-contact range finder emits a ranging transmission signal to pass through the opening to the second connecting portion, receives a ranging return signal reflected by the second connecting portion and passing through the opening, and calculates the distance according to the ranging transmission signal and the ranging return signal; and
determining whether the distance is within a preset range by the non-contact range finder.

10. The angle detecting method of claim 9, wherein the angle detecting device comprises a fixing plate, the non-contact range finder is mounted on the mounting portion by the fixing plate.

11. The angle detecting method of claim 9, wherein the second fixing portion is movably connected to the first fixing portion, the first connecting portion is sandwiched between the first fixing portion and the second fixing portion.

12. The angle detecting method of claim 11, wherein the first fixing portion comprises a third surface facing the second fixing portion, the second fixing portion comprises a fourth surface facing the third surface, the third surface is recessed inward to form two spaced first slots, the fourth surface is recessed inward to form two spaced second slots, a first bump is formed between the spaced first slots, a second bump is formed between the spaced second slots, each first slot corresponds to one of the second slots, the first bump corresponds to the second bump, the first bump and the second bump are used to clamp the first connecting portion.

13. The angle detecting method of claim 12, wherein the angle detecting device further comprises a fastening member sandwiched between the first bump and the second bump, the fastening member cooperates with the first bump to clamp the first connecting portion.

14. The angle detecting method of claim 13, wherein each of two opposite end portions of the fastening member extends to form an extending portion, a positioning hole is formed on each extending portion; the first fixing portion further comprises two positioning posts corresponding to the positioning holes, the positioning posts cooperate with the positioning holes to position the fastening member.

15. The angle detecting method of claim 9, wherein the angle detecting device further comprises a first test indicating lamp and a second test indicating lamp, the first test indicating lamp and the second test indicating lamp are electrically connected to the non-contact range finder, when the distance is within the preset range, the first test indicating lamp lights up; when the distance is not within the preset range, the second test indicating lamp lights up.

16. The angle detecting method of claim 9, wherein the angle detecting device further comprises an operation indicating lamp electrically connected to the non-contact range finder, when the non-contact range finder is in an operative state, the operation indicating lamp lights up; when the non-contact range finder is in an inoperative state, the operation indicating lamp turns off.

* * * * *